United States Patent [19]

Kishida et al.

[11] 4,128,605

[45] Dec. 5, 1978

[54] PROCESS FOR PREPARING VINYL CHLORIDE RESIN-ACRYLIC GRAFT COPOLYMER COMPOSITION

[75] Inventors: Kazuo Kishida, Otake; Jinpee Kobayashi, Iwakuni; Hajime Fukunaga, Otake, all of Japan

[73] Assignee: Mitsubishi Rayon Co., Ltd., Tokyo, Japan

[21] Appl. No.: 804,157

[22] Filed: Jun. 6, 1977

[30] Foreign Application Priority Data

Jun. 4, 1976 [JP] Japan .................................. 51-65314

[51] Int. Cl.² ............................................. C08L 51/00
[52] U.S. Cl. ................................. 260/876 R; 260/885
[58] Field of Search ............................. 260/876 R, 884

[56] References Cited

U.S. PATENT DOCUMENTS

| | | | |
|---|---|---|---|
| 3,661,994 | 5/1972 | Hwa et al. ............................. | 260/879 |
| 3,793,402 | 2/1974 | Owens ................................... | 260/876 |
| 3,971,835 | 7/1976 | Myers et al. ......................... | 260/876 R |
| 4,035,443 | 7/1977 | Ide et al. ............................... | 260/876 R X |

*Primary Examiner*—Carman J. Seccuro
*Attorney, Agent, or Firm*—Oblon, Fisher, Spivak, McClelland & Maier

[57] ABSTRACT

A vinyl chloride resin composition is prepared by (1) preparing an acrylic elastomer (A) by (a) polymerizing 30 to 50% by wt of an aromatic vinyl monomer in the presence of a polyfunctional cross-linking agent having at least one allyl group and a carboxylate anion surfactant as an emulsifier at a pH maintained between 7.0–9.5 and then (b) graft-polymerizing 50 to 70% by wt of an alkyl acrylate of 2 to 10 carbon atoms in the alkyl group onto said polymerized aromatic vinyl polymer in the presence of from 0.1 to 3 parts by wt of a polyfunctional cross-linking agent with at least one allyl group based on the weight of the sum of said aromatic vinyl monomer and said alkyl acrylate; (2) preparing a graft copolymer (B) by graft-polymerizing from 20 to 70 parts by wt of an aromatic vinyl monomer and methyl methacrylate onto 30 to 80 parts by weight of said acrylic elastomer (A) wherein from 70% to 20% by wt of said aromatic vinyl monomer is first graft-polymerized onto said elastomer (A) in the presence of an oil soluble initiator and then graft-polymerizing from 30 to 80% by wt of methyl methacrylate onto said grafted elastomer; and (3) mixing from 60 to 97 parts by wt of a vinyl chloride polymer with 3 to 40 parts by wt of said graft copolymer (B).

12 Claims, No Drawings

PROCESS FOR PREPARING VINYL CHLORIDE RESIN-ACRYLIC GRAFT COPOLYMER COMPOSITION

BACKGROUND OF THE INVENTION

Field of the Invention

The present invention relates to a process for preparing a vinyl chloride resin composition whose surface gloss features are excellent and which has excellent transparency, weather resistance, and impact resistance.

As a means of improving the weather resistance as well as the impact strength of certain resins, it has been proposed to modify such resins with a crosslinked acrylic ester as an elastomer component. Moreover, in order to further improve the impact strength characteristics of the resin, it has been proposed to use an elastomer which has a double layer structure with an outer shell of an acrylic ester and an inner core of a polymer having a high glass transition temperature. Resins are known which are obtained by the graft polymerization of vinyl chloride, styrene, methyl methacrylate, or acrylonitrile in the presence of the above cross-linked double layer acrylic ester elastomer. However, the transparency of the vinyl chloride resin component (hereinafter referred to as PVC) of the compositions is diminished, although the compositions possess improved weather resistance and impact resistance. In order to improve the transparency and impact strength of PVC compositions, U.S. Pat. No. 3,763,279 discloses a resin in which vinyl chloride is graft-polymerized onto a cross-linked double layer elastomer having an outer shell of an acrylic ester and a styrene core. In order that the resulting composition possess excellent transparency, however, it is necessary to limit the acrylic ester content of the double layer elastomer to 44 to 48% by weight, but this amount is insufficient to fully develop the impact strength of the product. Moreover, it is difficult to obtain a vinyl chloride resin composition which possesses excellent surface gloss from such a double layer elastomer composition.

U.S. Pat. No. 3,971,835 discloses a graft copolymer for the modification of vinyl halide polymers which is produced by graft-polymerizing methyl methacrylate onto a crosslinked double layer elastomer having an outer layer of an acrylic ester and a styrene core. The resulting composition does not possess a fully developed impact strength, transparency and surface gloss.

U.S. application Ser. No. 644,421 discloses vinyl halide polymer compositions which contain a graft copolymer of a cross-linked double-layer elastomer where the graft copolymer is produced by first polymerizing methyl methacrylate in the presence of a rubber polymer latex followed by polymerization of styrene so that the resulting composition may possess excellent transparency, excellent surface gloss properties, improved weather resistance and impact resistance. However, the composition does not possess satisfactory thermal stability and the improvement in impact strength is unsatisfactory.

A need therefore, continues to exist for a vinyl chloride resin composition of improved thermal stability, transparency and surface gloss characteristics.

SUMMARY OF THE INVENTION

One object of the present invention is to provide a vinyl chloride resin composition having favorable gloss, transparency and thermal stability as well as sufficient resistance to weathering and impact.

Briefly, this object and other objects of the present invention as hereinafter will become more readily apparent can be attained by a process for preparing a vinyl chloride resin composition by (1) preparing an acrylic elastomer (A) by (a) polymerizing 30 to 50% by wt of an aromatic vinyl monomer in the presence of a polyfunctional cross-linking agent having at least one allyl group and a carboxylate anion surfactant as an emulsifier at a pH maintained between 7.0–9.5 and then (b) graft-polymerizing 50 to 70% by wt of an alkyl acrylate of 2 to 10 carbon atoms in the alkyl group onto said polymerized aromatic vinyl polymer in the presence of from 0.1 to 3 parts by wt of a polyfunctional cross-linking agent with at least one allyl group based on the weight of the sum of said aromatic vinyl monomer and said alkyl acrylate; (2) preparing a graft copolymer (B) by graft-polymerizing from 20 to 70 parts by wt of an aromatic vinyl monomer and methyl methacrylate onto 30 to 80 parts by weight of said acrylic elastomer (A) wherein from 70% to 20% by wt of said aromatic vinyl monomer is first graft-polymerized onto said elastomer (A) in the presence of an oil soluble initiator and then graft-polymerizing from 30 to 80% by wt of methyl methacrylate onto said grafted elastomer; and (3) mixing from 60 to 97 parts by wt of a vinyl chloride polymer with 3 to 40 parts by wt of said graft copolymer (B).

DETAILED DESCRIPTION OF THE PREFERRED EMBODIMENTS

The objective of the present invention is the preparation of a vinyl chloride resin composition which possesses excellent surface gloss and transparency properties as well as excellent weathering and impact resistance properties. The resin comprises 97 to 60 parts by weight of a vinyl chloride polymer and 3 to 40 parts by weight of a graft copolymer (B) which can be obtained by emulsion-polymerizing a mixture of an aromatic vinyl monomer and a polyfunctional cross-linking agent having at least one allyl group in the presence of a carboxylate anion surfactant which is used as an emulsifier wherein the pH of the polymerizing medium is maintained between 7.0 to 9.5. In the presence of the resulting polymer latex, a mixture of an alkyl acrylate having 2 to 10 carbon atoms in the alkyl group and a polyfunctional cross-linking agent having at least one allyl group is polymerized to form an acrylic elastomer (A) in the first stage. The proportions of the alkyl acrylate and the aromatic vinyl monomer are 50 to 70% by weight and 50 to 30% by weight, respectively, and the amount of the cross-linking agent used ranges from 0.1 to 3 parts by weight per 100 parts by weight of both the alkyl acrylate and the aromatic vinyl monomer. In a first stage an aromatic vinyl monomer is graft-polymerized in the presence of the resulting acrylic elastomer (A) and an oil soluble initiator. Thereafter, in a second stage methyl methacrylate is graft polymerized. The proportions of the methyl methacrylate and the aromatic vinyl monomer range from 30 to 80% by weight and 70 to 20% by weight, respectively, and the total amounts of the methyl methacrylate and the aromatic vinyl monomer used range from 70 to 20 parts by weight per 30 to 80 parts by weight of the acrylic elastomer (A).

The present inventon is particularly characterized by a process for preparing the graft copolymer component which is used in the present vinyl chloride resin composition, wherein an acrylic elastomer (A) is prepared in the first stage by emulsion polymerization in the presence of a carboxylate anion surfactant under solution pH conditions maintained within the range of 7.0 to 9.5. Thereafter, an aromatic vinyl monomer is polymerized onto the acrylic elastomer in the presence of an oil soluble initiator. Subsequently, methyl methacrylate is polymerized onto the treated acrylic elastomer in a second reaction.

If the pH of the initial polymerizing medium is over 9.5, the allyl ester of the polyfunctional cross-linking agent and the ester of the alkyl acrylate of acrylic elastomer (A) are hydrolyzed. The graft-copolymer is unsuitable as a vinyl chloride modifier because the composition suffers from reduced transparency and impact resistance. If the pH of the initial polymerizing medium is below 7.0, the emulsion is destroyed, and the polymerization reaction can not proceed. Therefore, it is necessary to maintain the pH of the polymerizing medium within the range of 7.0–9.5. Because the emulsion polymerization medium in which a carboxylate anion surfactant is used is easily coagulated by use of sulfuric acid and then is washed, the thus obtained graft-copolymer has good thermal stability. The salt of a dialkyl sulfosuccinate which is commonly used in the emulsion polymerization of esters of acrylic acid, does not hydrolyze the esters. It is normally necessary to use a metal salt as a coagulator and a polyacid salt is used which usually is very efficient as a coagulator. However, a vinyl chloride resin composition possessing reduced thermal stability is obtained when a monoacid salt is used as a coagulator. Because it is generally inferior as a coagulator, large quantities of coagulator must normally be used.

When the emulsion polymerization is conducted in the presence of a dialkyl sulfosuccinate, the isolated graft copolymer obtained is insufficiently washed free of the surfactant since it is slightly soluble in water in comparison to carboxylate anion surfactants. The resulting graft copolymer is therefore unsuitable as a vinyl chloride modifier because of the emulsifier impurities in it and the vinyl chloride resin composition obtained possesses reduced thermal stability and physical properties.

In the graft-emulsion-polymerization, the acrylic elastomer latex is polymerized first with styrene in the presence of an oil soluble radical initiator. A subsequent polymerization of the polymer obtained is conducted with methyl methacrylate. The vinyl chloride resin composition obtained possesses less unfused polymers and has excellent surface gloss, excellent impact strength and transparency.

The emulsifier used in the present invention is a carboxylate anionic surfactant having the formula, RCOOM, wherein R is a hydrocarbon group of 8–22 carbon atoms and M is sodium, potassium, or ammonium ion. Suitable examples include potassium oleate, sodium oleate, laurate salts, rosinate salts, N-acylsarcosinate salts and the like. These emulsifiers can be used alone or in admixture.

The pH of the polymerization medium is maintained within the range of 7.0–9.5 by the addition of compounds which buffer the solution of the polymerizing latex. Suitable buffer systems include compound combinations such as boric acid-sodium carbonate-sodium hydroxide, potassium dihydrogen phosphate-disodium hydrogen phosphate, boric acid-potassium chloride-sodium carbonate, boric acid-sodium chloride-borax, potassium dihydrogen phosphate-borax, disodium hydrogen phosphate-citric acid, and the like.

Suitable oil soluble initiators in the present process include organic hydroperoxide-sodium formaldehyde sulfoxylate, organic hydroperoxide-ferrous salt, organic hydroperoxide-sodium formaldehyde sulfoxylate-ferrous salt. Suitable organic hydroperoxides include cumenehydroperoxide, t-butylhydroperoxide, diisopropyl benzene hydroperoxide, t-butylperoxyisopropyl carbonate, and the like.

Suitable aromatic vinyl monomer reactants include styrene and other related monomers such as, vinyltoluene, methylstyrene, chlorostyrene, bromostyrene, and the like. The alkyl acrylates which are used include those having 2 to 10 carbon atoms in the alkyl group such as, for example, ethyl acrylate, propyl acrylate, butyl acrylate, isobutyl acrylate, hexyl acrylate, n-octyl acrylate, 2-ethylhexyl acrylate, and the like. These monomers are used alone or in admixture.

The polyfunctional cross-linking agent should have one or more allyl groups in the molecule in order to improve the transparency, surface gloss, and impact resistance properties of the product. Suitable polyfunctional cross-linking agents having one or more allyl groups in the molecule include triallyl cyanurate, triallyl isocyanurate, allyl methacrylate, allyl acrylate, diallyl itaconate, and diallyl phthalate. Of these compounds allyl methacrylate and triallyl cyanurate are particularly preferred.

Cross-linking agents which do not contain an allyl group, such as divinylbenzene and diacrylate or dimethacrylate esters of polyhydric alcohols, are less effective in improving the transparency and surface gloss properties of the product. The reason for this has not been elucidated as yet, but is seems that crosslinking agents such as diacrylate esters are effective in cross-linking styrene polymers. However, since the degree of swelling of the double layer elastomer obtained by polymerizing an acrylic ester on the styrene polymer is high, the crosslinking of the layer of the acrylic ester polymer is insufficient with these cross-linking agents. When methyl methacrylate and an aromatic vinyl monomer are graft polymerized on the double layer elastomer, the extent of the grafting reaction is insufficient in comparison to the case where a polyfunctional cross-linking agent having allyl groups is used. However, the use of a crosslinking combination of a diacrylate ester and allyl group containing molecule, are effective in improving the transparency and surface gloss features of the product.

The previously mentioned polyfunctional crosslinking agent which contains allyl groups is used in amounts of 0.1 to 3 parts by weight per 100 parts by weight in total of the alkyl acrylate and aromatic vinyl monomers. If it is used in an amount less than 0.1 part, the crosslinking efficiency becomes insignificant, while if the amount exceeds 3 parts, the resulting elastomer loses its elasticity and becomes brittle and unable to impart the desired impact resistance to the vinyl chloride resin composition. The weight proportions of the polyfunctional cross-linking agent to the aromatic vinyl monomer and the alkyl acrylate are preferably 0.2 to 1.5 and 0.2 to 1.0, respectively. The allyl group containing cross-linking agent may be used in combination with a cross-linking agent which does not contain an allyl group, with the amount of the latter being up to 0.2 part by weight per 100 parts by weight in total of the alkyl acrylate and aromatic vinyl monomers.

The polymerization initiator which is used in the first stage can be any ordinary water-soluble inorganic initiator such as a persulfate, perborate, or the like. These compounds can be used alone or in combination with a sulfite, hydrogensulfite, or thiosulfate to form redox systems. Further, redox systems, such as organic hydroperoxide-ferrous salt and organic hydroperoxide-sodium formaldehyde-sulfoxylate, and azo compounds may also be used.

The emulsion polymerization can be conducted at any temperature above the decomposition temperature of the initiator used, but preferably at 60° to 80° C. in view of the polymerization time. Both of the cross-link polymerization reactions may be conducted by adding the whole of the mixture of a polyfunctional cross-linking agent and a monomer at one time or while continuously adding the whole or a part of the mixture. From the viewpoint of stability of the polymerization reaction and the dissipation of the heat of polymerization, it is preferable to conduct the polymerization while continuously adding the mixture. The particle diameter of the elastomer latex greatly affects the properties of the product vinyl chloride resin composition, because it determines the size of particles of the modifier dispersed in the vinyl chloride polymer. If the particle size of the modifier is too small, the impact strength of the product is not improved, while if it is too large, the transparency of the polymer is reduced. The preferred particle diameter of the elastomer latex is in the range from 0.07 to 0.25 μm, preferably 0.12 to 0.22 μm. In this way, an acrylic elastomer (A) of a double layer structure is obtained with a core of a polymer formed from an aromatic vinyl monomer and the previously described polyfunctional cross-linking agent and an outer shell of a polymer formed from an alkyl acrylate and the polyfunctional cross-linking agent.

Although it is desirable for the transparency to regulate the composition of acrylic elastomer (A) meaning that the refractive index thereof should approximate as close as possible to the refractive index of the vinyl chloride polymer. Yet the composition of the elastomer should be such that it may exhibit a sufficient elasticity for the development of the desired impact strength in the product. Since the transparency of the product is also affected by the nature of the graft copolymer (B) which is obtained from acrylic elastomer (A), it is possible to maintain the transparency of the vinyl chloride resin and to improve other properties of the vinyl chloride resin composition by adjusting the overall composition of the graft copolymer (B) to that previously described. With an increased dominance of an alkyl acrylate in the composition of acrylic elastomer (A), the resulting vinyl chloride resin composition possesses a higher impact strength, but a lower transparency, whereas when the aromatic vinyl monomer becomes dominant, the resin composition gains in transparency, but loses its impact strength. To obtain a vinyl chloride composition in which a proper balance is established between transparency and impact strength, the acrylic elastomer (A) should have such a composition that the alkyl acrylate content of the composition ranges from 50 to 70% by weight while the aromatic vinyl monomer content ranges from 50 to 30% by weight. Even when the composition of the elastomer is maintained within the above noted ranges, the impact resistance of the resin composition is not improved if an elastomer has been used which has been obtained by the random copolymerization of an alkyl acrylate and an aromatic vinyl monomer or if an elastomer has been used with a core of an alkyl acrylate and an outer shell of an aromatic vinyl monomer.

In the second stage of the preparation a graft copolymer (B) is formed by first graft-polymerizing an aromatic vinyl monomer and subsequently methyl methacrylate in their respective specific ratios onto the acrylic elastomer (A). A vinyl chloride resin composition possessing excellent surface gloss and transparency characteristics and favorable weather resistance and impact resistance characteristics may be obtained only by use of the graft copolymer (B) mentioned above.

The graft copolymer (B) is obtained by the graft polymerization of 70 to 20 parts by weight of the aromatic vinyl and methacrylate monomers onto 30 to 80 parts by weight (in terms of the solids content) of the acrylic elastomer (A). If the amount of the elastomer used is less than 30 parts by weight, the graft copolymer is less effective in improving the impact strength of the vinyl chloride resin composition, and if it exceeds 80 parts by weight, difficulties will be encountered in the steps of coagulating and drying the graft copolymer. Moreover, a vinyl chloride resin composition with markedly inferior processability and reduced impact strength will result.

The present graft copolymer (B) is prepared by graft polymerization in two consecutive steps in which an oil soluble initiator is used, first with 70 to 20% by weight of an aromatic vinyl monomer, and subsequently with 30 to 80% by weight of methyl methacrylate. Suitable aromatic vinyl monomers include styrene, which is preferred, α-substituted sytrenes, nuclear-substituted sytrenes, and derivatives thereof, such as vinyltoluene, α-methylstyrene, chlorostyrene, and the like. Another copolymerizable monomer may be included with the aromatic vinyl monomer in an amount less than 30 parts by weight, such as methyl methacrylate, ethyl methacrylate, butyl methacrylate, methyl acrylate, ethyl acrylate or the like. The methyl methacrylate used in the subsequent polymerization step contains less than 30 parts by weight of another copolymerizable monomer such as ethyl methacrylate, butyl methacrylate, methyl acrylate, ethyl acrylate, butyl acrylate, or the like. The higher the proportion of methyl methacrylate in the grafted monomers, the lower the impact strength, and the transparency of the product and the surface gloss of sheets of the product deteriorate, whereas the greater the aromatic vinyl monomer content, the lower the compatibility of the graft copolymer with the vinyl chloride polymer which results in deterioration in the impact strength and transparency of the product. When the graft polymerization is conducted first with an aromatic vinyl monomer and subsequently with methyl methacrylate, a great number of unfused polymer particles appear in sheets made from the vinyl chloride resin composition which adversely affects the surface characteristics of the product. On the other hand, when the graft polymerization is conducted in the presence of an oil soluble initiator first with an aromatic vinyl monomer and then with methyl methacrylate, the resulting vinyl chloride resin composition is superior in the surface characteristics of sheets prepared from the product. Moreover, the sheets possess excellent thermal stability, impact strength and transparency.

The graft polymerization reactions are each allowed to proceed by adding the vinyl aromatic and methacrylate monomers all at one time, continuously or intermittently. If the graft polymerization is allowed to proceed by simultaneously adding methyl methacrylate and the aromatic vinyl monomer, the transparency, surface characteristics of the sheets prepared from the product and the weather resistance of the vinyl chloride resin composition deteriorates.

The graft polymerization reaction can be conducted either in succession for the formation of the elastomer component (A) or separately in different reactors under the customary conditions for emulsion polymerization with or without the addition of an initiator, chain-transfer, cross-linking agent, or the like. These additives may be the same as or different from those used in preparing the elastomer (A). The latex of the graft copolymer (B) thus formed is subjected to, for example, coagulation by salting out, washing, drying and preferably pulverization.

A resin composition is obtained by the present process which comprises 3 to 40 parts by weight of the graft copolymer (B) thus formed and 97 to 60 parts by weight of a vinyl chloride polymer. Suitable vinyl chloride polymers include not only polyvinyl chloride but also vinyl chloride copolymers containing 70% by wt. or more of vinyl chloride. Suitable comonomers include, for example, vinyl bromide, vinylidene chloride, vinyl acetate, acrylic esters, methacrylic esters, and the like.

The graft copolymer (B) and the vinyl chloride polymer, both preferably in the form of powder, are mixed by means of, for example, a ribbon blender, Henschel mixer, or the like, and molded by means of a conventional milling machine such as, a mixing roll, Banbury mixer, extruder, or injection machine. If necessary, the customary stabilizers, plasticizers, processing aids, and pigments may be added during the mixing operation. If the amount of graft copolymer (B) in the final composition is less than 3 parts by weight, the impact strength is low. However, if the amount exceeds 40 parts by weight, the excellent properties of the vinyl chloride polymer are lost. Moreover, it is uneconomical to use excessive amounts of the adjunct.

Having generally described this invention, a further understanding can be obtained by reference to certain specific examples which are provided herein for purposes of illustration only and are not intended to be limiting unless otherwise specified.

EXAMPLE 1

(A) Preparation of the acrylic elastomer latex

In 180 parts of ion-exchanged water, which had been treated with nitrogen to displace air in the solution and placed in a reactor, were dissolved 0.45 part of boric acid, 0.045 part of anhydrous sodium carbonate, 2.0 parts of a potassium salt of a fatty acid (an emulsifier made by Nippon-Yushi Co.) and 0.15 part of potassium persulfate. To the resulting aqueous solution maintained at 70° C. was added a monomer mixture of 47.5 parts of styrene and 0.8 part of allyl methacrylate and the polymerization reaction was allowed to proceed. The pH of the latex was 8.5. The reaction mixture was maintained at the same temperature to complete the polymerization. The conversion was 96% and the average particle diameter of the resulting latex was 0.15 μm and the pH of the resulting latex was 7.8.

To the thus formed latex, maintained at 70° C. and without the addition of a fresh emulsifier, was added dropwise over a period of 90 minutes a mixture of monomers of 52.5 parts of n-butyl acrylate, and 1.0 part of allyl methacrylate, and the polymerization reaction was allowed to proceed. After completion of the dropwise addition, the reaction mixture was further maintained at the same temperature for one hour to complete the polymerization reaction. The pH of the resulting latex was 7.6, the conversion was 98% and the resulting elastomer latex had an average particle diameter of 0.16 μm, a gel content of 89.5%, and a degree of swelling of 6.5.

The gel content and degree of swelling of the elastomer latex were determined by drying a sample of the latex in a Petri dish, immersing a portion, Wo(g), of the dried latex in methylethylketone at 30° C. for 48 hours, and measuring the weight, $W_1$ (g), of the swollen sample and the weight, $W_2$ (g), of the bone dry sample.

$$\text{Gel content (\%)} = \frac{W_2}{W_0} \times 100$$

$$\text{Degree of swelling} = \frac{W_1}{W_2}$$

(B) Preparation of the graft copolymer

Into a reactor were charged 70 parts (in terms of solids) of the acrylic elastomer latex obtained in (A), 200 parts of water (the total amount of the water in the latex plus the water used to dissolve sodium formaldehyde sulfoxylate), and 0.1 part of sodium formaldehyde sulfoxylate. To the resulting mixture, maintained at 70° C., was added dropwise a mixture over a period of 30 minutes of 15 parts of styrene and 0.05 part of cumene hydroperoxide, and the polymerization was allowed to proceed. After completion of the dropwise addition, the reaction mixture was further maintained at the same temperature for one hour to complete the polymerization reaction. To the polymerization mixture was added dropwise a mixture over a period of 30 minutes of 15 parts of methyl methacrylate and 0.05 part of cumene hydroperoxide and the polymerization reaction was allowed to proceed. After completion of the dropwise addition, the polymerization mixture was allowed to stand for 10 additional minutes to complete the polymerization reaction. The conversion was 96% or higher and the resulting graft copolymer latex had an average particle diameter of 0.185 μm.

The thus obtained graft copolymer latex was coagulated by salting-out with an aqueous sulfuric acid solution, washed, dehydrated, and dried to obtain a resin in the powder form.

(C) Preparation of the vinyl chloride resin composition

Using a Henschel mixer, 10 parts of the graft copolymer obtained in (B), 100 parts of a vinyl chloride polymer having an average polymerization degree of 700, 2.0 parts of dibutyltin maleate, 2.0 parts of a lubricant, and 1.5 parts of a processing aid (made by Mitsubishi Rayon Co.) were mixed until the temperature reached 115° C. and a uniform mixture was obtained. The resulting vinyl chloride resin composition was milled for 5 minutes by means of a mixing roll maintained at 190° C., and then compression-molded at 180° C., under a pressure of 150 kg/cm², for 5 minutes to prepare test specimens for testing impact strength, light transmittance, and haze. The impact strength was measured by the method specified in JIS K 6745 (thickness of specimen:

5.0) and the light transmittance and haze were measured by the methods specified in JIS K 6714 (thickness of specimen: 2.0 mm).

Other acrylic elastomer latices were prepared in the same manner as in (A), except that styrene and n-butyl acrylate were used in the proportions shown in Table 1. Using these latices, vinyl chloride resin compositions and test specimens were prepared by the same procedures as used in (B) and (C).

The compositions of the acrylic elastomers and the properties of the vinyl chloride resin compositions obtained therefrom were as shown in Table 1. In Table 1, St stands for styrene and BuA for n-butyl acrylate.

TABLE 1

| | Composition of elastomer | | Vinyl chloride resin composition | | |
|---|---|---|---|---|---|
| | | | Charpy impact strength, | Total transmittance | Haze |
| Run No. | St, % | BuA, % | kg.cm/cm² | % | % |
| 1 (comparison) | 0 | 100 | 9.7 | 19.8 | 96.1 |
| 2 (present invention) | 30 | 70 | 22.4 | 71.3 | 28.6 |
| 3 (present invention) | 40 | 60 | 20.1 | 78.8 | 19.0 |
| 4 (present invention) | 47.5 | 52.5 | 18.5 | 82.4 | 13.6 |
| 5 (comparison) | 55 | 45 | 7.8 | 84.3 | 12.4 |
| 6 (comparison) | 70 | 30 | 5.6 | 85.4 | 110 |

As is apparent from Table 1, with an increase in the styrene content of the product, the transparency is improved, while the impact resistance is decreased; with an increase in n-butyl acrylate content, the impact resistance is improved, while the transparency is decreased. No resin composition with well-balanced properties was obtained from the elastomers which had compositions not falling within the ranges herein specified.

EXAMPLE 2

Two types of acrylic elastomers were prepared in the same manner as described in Example 1 - (A), except that styrene and n-butyl acrylate were simultaneously random-copolymerized or n-butyl acrylate was first polymerized to form the core and then styrene was polymerized to form the shell. Thereafter the same procedure as described in Example 1 was repeated whereby vinyl chloride resin compositions were obtained which had the properties shown in Table 2. In Table 2, the temperatures presented at the top of each column were those at which Charpy impact tests were conducted.

TABLE 2

| | Composition of elastomer | | Vinyl Chloride Resin Composition, Charpy impact strength, kg.cm/cm² | | | |
|---|---|---|---|---|---|---|
| Run No. | Core | Shell | 20° C | 0° C | −10° C | −20° C |
| 4 (present invention) | 47.5(St) | 52.5(BuA) | 18.5 | 13.9 | 9.6 | 7.1 |
| 7 (comparison) | 47.5/52.5 (St/BuA) | — | 14.5 | 7.4 | 5.0 | 3.5 |
| 8 (comparison) | 52.5 (BuA) | 47.5 (St) | 5.5 | 3.6 | 3.6 | 3.3 |

As is apparent from Table 2, a high impact strength was developed by use of the present elastomer consisting of a double layer structure having a core of an aromatic vinyl monomer and a shell of an alkyl acrylate, whereas a product of only a low impact strength was attained when an elastomer of a reversed double layer structure or an elastomer of a random copolymer was used.

EXAMPLE 3

Acrylic elastomers were prepared in the same manner as described in Example 1 - (A), except that the emulsifier and pH of polymerizing medium were varied as shown in Table 3 and graft copolymers were prepared in a similar manner as described in Example 1 - (B) from the elastomer latexes formed in Example 1 - (A) and the coagulators were used as shown in Table 3. The properties of the obtained vinyl chloride resin compositions are shown in Table 3.

Table 3

| | pH adjustment (parts) H₃BO₃/Na₂CO₃ | pH of first step of polymerization medium | Emulsifier 1) | Coagulator | Vinyl chloride resin composition | | | Thermal stability 190° C × 60 min. in Geer Oven | |
|---|---|---|---|---|---|---|---|---|---|
| | | | | | Charpy Impact strength kg-cm/cm² | Total transmittance % | Haze % | 2) alone | 3) sheeting |
| Run No. | | | | | | | | | |
| 9 (comparison) | 0.45/0.45 | 10.0 | TK-1 | H₂SO₄ | 9.2 | 70.4 | 34.5 | ⊙ | ⊙ |
| 10 present invention) | 0.45/0.22 | 9.5 | " | " | 18.3 | 78.2 | 18.3 | ⊙ | ⊙ |
| 10'(") | (KH₂PO₄/Na₂HPO₄) = 0.13/1.1 | 8.9 | " | " | 18.1 | 81.7 | 14.5 | ⊙ | ⊙ |
| 4 (") | 0.45/0.045 | 8.5 | " | " | 18.5 | 82.4 | 13.6 | ⊙ | ⊙ |
| 4' (") | 0.45/0.02 | 7.2 | " | " | 17.1 | 78.0 | 19.2 | ⊙ | ⊙ |
| 11(comparison) | 0.43/0.01 | 6.8 | " | not polymerized | — | — | — | — | — |
| 12(") | 0 | 10.5 | " | H₂SO₄ | 10.5 | 63.5 | 50.0 | ⊙ | ⊙ |
| 13 (") | — | 2.8 | OTP | AlCl₃ | 17.3 | 82.1 | 14.3 | Δ~X | Δ~X |
| 14 (") | — | 2.8 | " | NaCl | 17.3 | 82.2 | 14.1 | ○~Δ | ○~Δ |

Rating of thermal stability:⊙>○>○~Δ>Δ>Δ~X
1) TK-1 : Potassium salt of fatty acid
  OTP: Dialkyl sulfo succinate
2) Thermal stability of graft copolymer
3) Thermal stability of vinyl chloride resin sheets As is apparent from Table 3, when the potassium salt of fatty acid as an emulsifier is used, the pH of the polymerizing medium is over 9.5, and therefore hydrolysis of the esters of the acrylic elastomer occur and a resin composition of reduced transparency is obtained. When the pH is below 7.0, the polymerization rate is decreased. Therefore, it is necessary to maintain the pH of the polymerizing medium within the range of 7.0 to 9.5. When the salt of a fatty acid was used as the emulsifier, the thermal stability of the resin composition obtained was excellent in comparison to the resin composition in which a dialkyl sulfosuccinate was used.

EXAMPLE 4

Several acrylic elastomers were prepared in the same manner as described in Example 1 - (A), except that the types and quantities of the cross-linking agent were varied as shown in Table 4, provided that the proportion of the crosslinking agent to styrene was the same as that to n-butyl acrylate. In Table 4, various degrees of swelling and gel content are shown of the resulting elastomers and properties of the vinyl chloride resin compositions obtained in the same manner as described in Example 1. In Table 4, TAIC stands for triallyl isocyanurate, AA for allyl acrylate, AMA for allyl methacrylate, DVB for divinylbenzene, and DEGDA for diethylene glycol diacrylate, and the quantity (in parts) of the crosslinking agent is based on 100 parts of the total monomer content.

TABLE 4

| | Elastomer | | | Vinyl chloride resin composition | | |
|---|---|---|---|---|---|---|
| Run No. | Cross-linking agent, parts | Swelling degree | Gel Content % | Charpy impact strength kg. cm/cm$^2$ | Total transmittance % | Haze, % |
| 15 (present invention) | TAIC 1 | 8.5 | 89.1 | 15.5 | 79.5 | 17.8 |
| 16 (″) | AA 1 | 6.1 | 89.0 | 16.6 | 81.5 | 13.8 |
| 17 (″) | AMA 0.1 | 25.7 | 74.1 | 8.0 | 79.4 | 24.7 |
| 18 (″) | AMA 0.5 | 8.5 | 85.0 | 18.8 | 82.5 | 18.6 |
| 19 (″) | AMA 1.0 | 6.2 | 88.5 | 17.6 | 82.7 | 13.2 |
| 20 (″) | AMA 2.0 | 5.6 | 90.0 | 15.9 | 82.3 | 19.6 |
| 21 (″) | AMA 5.0 TAC 1.0 | 4.5 | 94.0 | 12.0 | 81.4 | 22.6 |
| 22 (″) | DVB 0.25 | 6.8 | 87.4 | 20.4 | 82.6 | 13.3 |
| 23 (comparison) | AMA 0 | ∞ | 0 | 2.7 | 40.1 | 80.5 |
| 24 (″) | AMA 10.0 | 3.6 | 97.8 | 5.3 | 70.2 | 34.0 |
| 25 (″) | DBV 1.0 | 17.2 | 85.0 | 14.6 | 69.0 | 28.1 |
| 26 (″) | DEGDA 1.0 | 19.0 | 74.2 | 12.8 | 52.8 | 64.1 |

EXAMPLE 5

Acrylic elastomers were prepared in the same manner as described in Example 1 - (A), except that 40 parts of styrene and 60 parts of the various alkyl acrylates, as shown in Table 5, were used. The properties of the vinyl chloride resin compositions obtained in the same way as described in Example 1 were as shown in Table 5.

TABLE 5

| | Alkyl* | Vinyl chloride resin composition | | |
|---|---|---|---|---|
| Run No. | acrylate used in preparing elastomer | Charpy impact strength kg.cm/cm$^2$ | Total transmittance, % | Haze % |
| 27 (comparison) | MA | 6.4 | 80.3 | 17.9 |
| 28 (present invention) | EA | 15.9 | 79.4 | 18.2 |
| 29 (″) | 2EHA | 19.9 | 80.1 | 18.8 |

Note:
*MA methyl acrylate
EA ethyl acrylate
2EHA 2-ethylhexyl acrylate

EXAMPLE 6

Graft copolymers were prepared in a manner similar to that described in Example 1 - (B) by using the elastomer latex prepared in Example 1 - (A) in varying proportions to the monomers to be grafted onto the latex, the total of said elastomer latex (in terms of solids), styrene (St), and methyl methacrylate (MMA) being 100 parts. The properties of the vinyl chloride resin compositions prepared in a manner similar to that described in Example 1 - (C) by use of the resulting graft copolymers were as shown in Table 6.

TABLE 6

| | Elastomer, parts in terms of solids content | Monomer grafted | | Vinyl Chloride resin composition | | |
|---|---|---|---|---|---|---|
| Run No. | | St parts | MMA parts | Charpy impact Strength kg.cm/cm$^2$ | Total transmittance, % | Haze % |
| 30 (comparison) | 10 | 45 | 45 | 3.1 | 88.1 | 19.1 |
| 31 (present invention) | 30 | 35 | 35 | 8.4 | 85.2 | 17.8 |
| 32 (″) | 50 | 25 | 25 | 12.6 | 83.7 | 15.1 |
| 4 (″) | 70 | 15 | 15 | 18.5 | 82.4 | 13.6 |
| 33 (″) | 80 | 10 | 10 | 20.1 | 80.3 | 15.2 |

EXAMPLE 7

Graft copolymers were prepared in a manner similar to that described in Example 1 - (B) by using 70 parts (in terms of solids content) of the elastomer latex formed in Example 1 - (A) except that the initiator used was changed as shown in Table 7 and random-copolymerized with styrene (St) and methyl methacrylate (MMA), or graft-copolymerized with styrene first and then methyl methacrylate. Vinyl chloride resin compositions were prepared in a manner similar to that described in Example 1 by using the thus obtained graft copolymers. The resulting resin compositions were extrusion-molded by means of a 40-mm φ extruder provided with a T die to form sheets, 0.3 mm in thickness, which were evaluated for surface characteristics and transparency. Each of the sheets were compression-molded at 180° C., under a pressure of 150 kg/cm$^2$, for 5 minutes whereby molded test speciments (press sheet) were obtained and were tested for impact strength, transparency, and haze. The test results are shown in Table 7.

TABLE 7

| | | Monomer grafted | | Surface characteristics of sheeting | | Vinyl chloride resin composition | | | | |
|---|---|---|---|---|---|---|---|---|---|---|
| Run No. | Elastomer, parts in terms of solids | Initiator (%) | First step, parts | Second step, parts | F.E. | Gloss | 1) Total transmittance, % | 1) Haze % | Charpy impact strength kg. cm/cm² | 2) Total transmittance, % | 2) Haze, % |
| 4 (present invention) | 70 | CHP/SFS 0.3/0.3 | St 15 | MMA 15 | ⊙ | ⊙ | 91.3 | 7.2 | 18.8 | 82.8 | 13.0 |
| 34 (comparison) | 70 | " | MMA/St 15/15 | — | ⊙ | ○~Δ | 80.4 | 21.6 | 11.4 | 73.4 | 40.5 |
| 35 (") | 70 | KPS 0.3 | St 15 | MMA 15 | Δ~X | ○ | 89.5 | 8.3 | 17.5 | 82.5 | 20.1 |

Note:
Rating of surface characteristics: ⊙>○>○~Δ>Δ>Δ~X
F.E. (fish-eye): Unfused polymer particles in the surface of sheeting.
1) Thickness of sheeting was 0.3 mm.
2) Thickness of sheeting was 0.2 mm
CHP — cumene hydroperoxide
SFS — sodium formaldehyde sulfoxylate
KPS — potassium persulfate It was unexpected that as seen from Table 6, even when two grafted polymers are the same in graft composition and refractive index, that they could be so substantially different from each other in transparency, depending upon the method of graft polymerization employed. Although a resin composition excellent in transparency, impact strength and surface characteristics was obtained by first, graft-polymerizing styrene and then methyl methacrylate in the presence of an oil soluble redox initiator, a large number of unfused polymer particles were found when potassium persulfate was used as the initiator.

EXAMPLE 8

Vinyl Chloride resin compositions were prepared by use of 70 parts (in terms of solids content) of the elastomer latex obtained in Example 1 - (A) in the same manner as described in Example 1, except that the particle size of elastomer varied with the amount of emulsifier used. In Table 8 are shown the evaluation results, which were conducted on the sheets and test speciments prepared from each resin composition in the same manner as described in Example 7.

As is apparent from Table 8, when the particle size of the elastomer latex is too small, the impact strength is reduced. If the particles size is too large, the transparency becomes markedly inferior, whereas various products of the present invention having a range of particles sizes show excellent transparency and impact resistance.

TABLE 8

| | elastomer | | Vinyl Chloride resin composition | | |
|---|---|---|---|---|---|
| Run No. | emulsifier (parts) | Particles size (um) | Charpy impact strength kg.cm/cm² | Total transmittance, % | Haze % |
| 38 (comparison) | 10 | 0.055 | 4.2 | 92.4 | 6.9 |
| 39 (present invention) | 5.0 | 0.07 | 8.5 | 90.2 | 8.2 |
| 40 (present invention) | 3.0 | 0.12 | 15.2 | 87.3 | 11.8 |
| 4 (present invention) | 2.0 | 0.185 | 18.5 | 82.5 | 13.5 |
| 41 (present invention) | 1.5 | 0.22 | 19.7 | 78.2 | 19.2 |
| 41 (present invention) | 1.2 | 0.25 | 21.3 | 72.1 | 27.1 |
| 43 (comparison) | 1.0 | 0.29 | 21.2 | 57.5 | 38.3 |

EXAMPLE 9

Vinyl chloride resin compositions were prepared by use of 70 parts (in terms of solids content) of the elastomer latex obtained in Example 1 - (A) in the same manner as described in Example 1, except that methyl methacrylate and styrene were used in varying proportions in the graft polymerization reaction. In Table 9 are shown the results of the evaluations conducted on the sheets and test specimens prepared from each resin composition in the same manner as described in Example 7.

TABLE 9

| | Monomer grafted | | Vinyl chloride resin composition | | | | |
|---|---|---|---|---|---|---|---|
| | 1st step | 2nd step | surface characteristics of sheets | | Charpy impact strength | Total transmittance, | Haze, |
| Run No. | St, % | MMA, % | F.E. | Gloss | kg. cm/cm² | % | % |
| 44 (comparison) | 80 | 20 | ⊙ | ○ | 6.5 | 27.0 | 95.9 |
| 45 (present invention) | 70 | 30 | ⊙ | ⊙~○ | 13.1 | 78.1 | 26.8 |
| 4 (present | 50 | 50 | ⊙ | ⊙ | 18.8 | 82.7 | 13.0 |

TABLE 9-continued

| | Monomer grafted | | Vinyl chloride resin composition | | | | |
|---|---|---|---|---|---|---|---|
| | 1st step | 2nd step | surface characteristics of sheets | | Charpy impact strength | Total transmittance, | Haze, |
| Run No. | St, % | MMA, % | F.E. | Gloss | kg. cm/cm² | % | % |
| invention 46(present invention | 20 | 80 | ◉ | ◉ | 15.0 | 79.6 | 20.1 |
| 47(comparison) | 0 | 100 | Δ | ◉~○ | 11.7 | 73.3 | 29.9 |

Note:
Rating is the same as described in Table 6

As is apparent from Table 9, if the proportion of styrene in the grafted monomers is too large, the transparency of the product becomes markedly inferior and also the impact strength is reduced, while when the proportion of methyl methacrylate is too large in proportion, a great number of fish-eyes are formed in the surface of the product sheets, adversely affecting the surface characteristics.

COMPARATIVE EXAMPLE

Vinyl chloride resin compositions were prepared in the same manner as described in Example 1 - (C), except that commercial modifiers normally used for vinyl chloride resins, such as a methyl methacrylate-butadiene-styrene resin (MBS) and chlorinated polyethylene (ClPE), were used in place of the graft copolymer prepared in Example 1 - (B). In Table 10 are shown the properties of these resin compositions, together with the properties of the vinyl chloride resins (PVC) which have an average polymerization degree of 700 which had been used in Example 1 - (C), and of the present resin composition. The weather resistance is expressed in terms of the Charpy impact strength of the test specimens which had been treated by a Weather-O-meter (Toyo Rika Co., type WF-II).

TABLE 10

| | Surface characteristics of sheets | | | Press Sheet | | Weather resistance (Charpy impact strength, kg-cm/cm²) | | | |
|---|---|---|---|---|---|---|---|---|---|
| Modifier | Total transmittance, % | Haze % | Gloss | Total transmittance, % | Haze, % | 0 hour | 100 hours | 500 hours | 1,000 hours |
| Graft copolymer of Example 1-(B) | 91.3 | 7.4 | ◉ | 82.7 | 13.0 | 18.8 | 14.2 | 13.1 | 11.2 |
| MBS | 90.2 | 11.4 | ◉ | 82.6 | 16.2 | 22.7 | 3.2 | 1.9 | 2.1 |
| ClPE | 68.9 | 54.1 | X | 28.4 | 95.3 | 12.1 | 10.8 | 3.1 | 2.6 |
| None | 91.7 | 7.0 | ◉ | 85.4 | 10.9 | 2.8 | 2.8 | 3.1 | 3.0 |

As is apparent from Table 10, the present vinyl chloride resin composition is capable of yielding sheets of material which have a surface gloss of an excellence never before attained by use of an acrylic elastomer, while also processing excellent transparency and impact strength. The weather resistance of the present composition was also excellent, as evaluated by the retention of impact strength after 1,000 hours of exposure to weather conditions.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A process for preparing vinyl chloride resin composition comprising the steps of:

(1) preparing an acrylic elastomer (A) by (a) polymerizing 30 to 50% by wt. of an aromatic vinyl monomer in the presence of a polyfunctional cross-linking agent having at least one allyl group and a carboxylate anion surfactant as an emulsifier at a pH maintained between 7.0–9.5 and then (b) graft-polymerizing 50 to 70% by wt. of an alkyl acrylate of 2 to 10 carbon atoms in the alkyl group onto said polymerized aromatic vinyl polymer in the presence of from 0.1 to 3 parts by wt. of a polyfunctional cross-linking agent with at least one allyl group based on the weight of the sum of said aromatic vinyl monomer and said alkyl acrylate;

(2) preparing a graft copolymer (B) by graft-polymerizing from 20 to 70 parts by wt. of an aromatic vinyl monomer and methyl methacrylate onto 30 to 80 parts by weight of said acrylic elastomer (A) wherein from 70% to 20% by wt. of said aromatic vinyl monomer is first graft-polymerized onto said elastomer (A) in the presence of an oil soluble initiator and then graft-polymerizing from 30 to 80% by wt. of methyl methacrylate onto said grafted elastomer; and (3) mixing from 60 to 97 parts by wt. of a vinyl chloride polymer with 3 to 40 parts by wt. of said graft copolymer (B).

2. The process of claim 1, wherein 40 to 20 parts by weight in total of the methyl methacrylate and the aromatic vinyl monomer are grafted onto 60 to 80 parts by weight of the acrylic elastomer (A) to form said graft copolymer (B) such that the proportions of said methyl methacrylate and said aromatic vinyl monomer range from 40 to 60% by weight and 60 to 40% by weight, respectively.

3. The process of claim 1, wherein said elastomer (A) is an elastomeric latex of a particle size radius in the range of 0.12 to 0.22 μm.

4. The process of claim 1, wherein the alkyl acrylate in said acrylic elastomer (A) is n-butyl acrylate, n-octyl acrylate, or 2-ethylhexyl acrylate.

5. The process of claim 1, wherein the polyfunctional cross-linking agent having at least one allyl group in the molecule and used in the acrylic elastomer (A) is allyl methacrylate, triallyl cyanurate, or triallyl isocyanurate, and the portion of the polyfunctional cross-linking agent to the aromatic vinyl monomer and the alkyl acrylate by weight are 0.2 to 1.5 and 0.2 to 1.0 respectively.

6. The process of claim 1, wherein said emulsifier has the formula R $CO_2$M, wherein M is sodium, potassium or ammonium ion and R is a hydrocarbon group of 8-22 carbon atoms.

7. The process of claim 1, wherein said aromatic vinyl monomer is styrene, vinyltoluene, α-methylstyrene, chlorostyrene or bromostyrene.

8. The process of claim 1, wherein in the preparation of said graft copolymer B less than 30 parts by wt. of a comonomer selected from the group consisting of methyl methacrylate, ethyl methacrylate, butyl methacrylate, methyl acrylate and ethyl acrylate is combined with said aromatic vinyl monomer.

9. The process of claim 1, wherein in the preparation of said graft copolymer B less than 30 parts by wt. of a comonomer selected from the group consisting of ethyl methacrylate, butyl methacrylate, methyl acrylate, ethyl acrylate, and butyl acrylate is combined with said methyl methacrylate.

10. A vinyl chloride resin composition prepared by the process of claim 1.

11. The process of claim 1 wherein said oil soluble initiator is selected from the group consisting of organic hydroperoxide-sodium formaldehyde sulfoxylate, organic hydroperoxide-ferrous salt, and organic hydroperoxide-sodium formaldehyde sulfoxylate-ferrous salt.

12. The process of claim 11 wherein said organic hydroperoxide is selected from the group consisting of cumenehydroperoxide, t-butylhydroperoxide, diisopropyl benzene hydroperoxide and t-butylperoxyisopropyl carbonate.